(12) United States Patent
Lee et al.

(10) Patent No.: US 11,858,377 B2
(45) Date of Patent: Jan. 2, 2024

(54) INFORMATION PROVISION SERVICE SYSTEM FOR ELECTRIC VEHICLE USING VEHICLE SENSORS

(71) Applicant: ECOBRAIN CO., LTD., Jeju-si (KR)

(72) Inventors: Young Mi Lee, Hanam-si (KR); Byung Sik Kim, Hanam-si (KR)

(73) Assignee: ECOBRAIN CO., LTD., Jeju-si (KR)

( * ) Notice: Subject to any disclaimer, the term of this patent is extended or adjusted under 35 U.S.C. 154(b) by 241 days.

(21) Appl. No.: 17/422,089

(22) PCT Filed: Sep. 14, 2020

(86) PCT No.: PCT/KR2020/012372
§ 371 (c)(1),
(2) Date: Jul. 9, 2021

(87) PCT Pub. No.: WO2021/101048
PCT Pub. Date: May 27, 2021

(65) Prior Publication Data
US 2022/0097557 A1    Mar. 31, 2022

(30) Foreign Application Priority Data
Nov. 21, 2019 (KR) .......................... 10-2019-0150121

(51) Int. Cl.
*B60L 58/12*    (2019.01)
*B60W 20/20*    (2016.01)
*G01C 21/34*    (2006.01)

(52) U.S. Cl.
CPC ............. *B60L 58/12* (2019.02); *B60W 20/20* (2013.01); *G01C 21/3469* (2013.01); *B60W 2555/20* (2020.02)

(58) Field of Classification Search
CPC ... B60L 58/12; B60W 20/20; B60W 2555/20; G01C 21/3469
See application file for complete search history.

(56) References Cited

U.S. PATENT DOCUMENTS

| 10,023,176 B2 * | 7/2018 | Tabanoglu ................ B60L 3/12 |
| 2010/0094496 A1 * | 4/2010 | Hershkovitz ........... B60L 50/66 701/22 |

(Continued)

FOREIGN PATENT DOCUMENTS

| KR | 10-2013-0020468 A | 2/2013 |
| KR | 10-2016-0049950 A | 5/2016 |

(Continued)

*Primary Examiner* — James J Lee
*Assistant Examiner* — Jonathan E Reinert
(74) *Attorney, Agent, or Firm* — Goldilocks Zone IP Law; Sang Chul Kwon

(57) ABSTRACT

The present disclosure relates to an information provision service system for an electric vehicle. More particularly, the present disclosure relates to an information provision service system for an electric vehicle using a vehicle sensor, wherein the system estimates a battery status and a distance to empty of an electric vehicle considering weather condition and to information based on a path, and estimates a battery status through an analysis of big data by using travel and weather information measured by a vehicle sensor and weather observation and forecast information from outside, thereby achieving accurate estimation.

13 Claims, 17 Drawing Sheets

(56) References Cited

U.S. PATENT DOCUMENTS

| | | | | |
|---|---|---|---|---|
| 2015/0226572 A1* | 8/2015 | North | ................ | B60L 53/66 |
| | | | | 701/400 |
| 2016/0129918 A1* | 5/2016 | Skaff | ................ | B60W 50/14 |
| | | | | 340/455 |
| 2017/0291600 A1* | 10/2017 | Styles | ................ | F02D 41/021 |
| 2018/0066958 A1* | 3/2018 | Choi | ................ | B60L 50/60 |
| 2018/0143029 A1* | 5/2018 | Nikulin | ............ | G01C 21/3415 |

FOREIGN PATENT DOCUMENTS

| | | |
|---|---|---|
| KR | 10-1716460 B1 | 3/2017 |
| KR | 10-2018-0027719 A | 3/2018 |

\* cited by examiner

[FIG. 1]
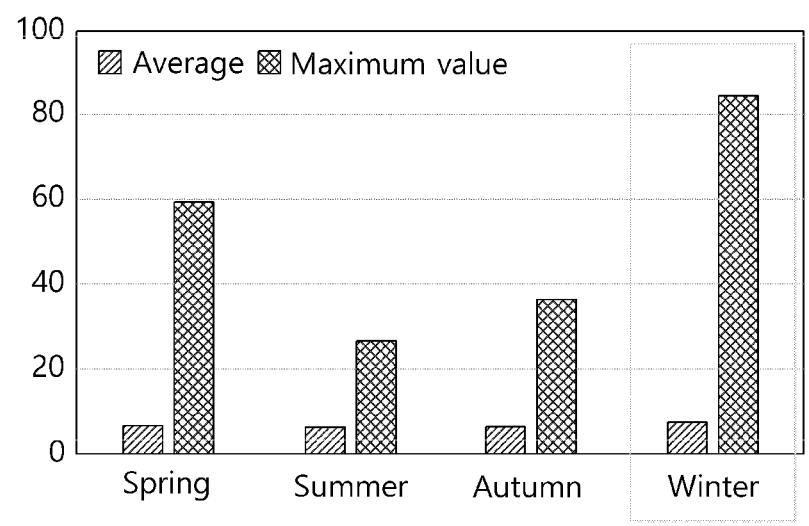

[FIG. 2]
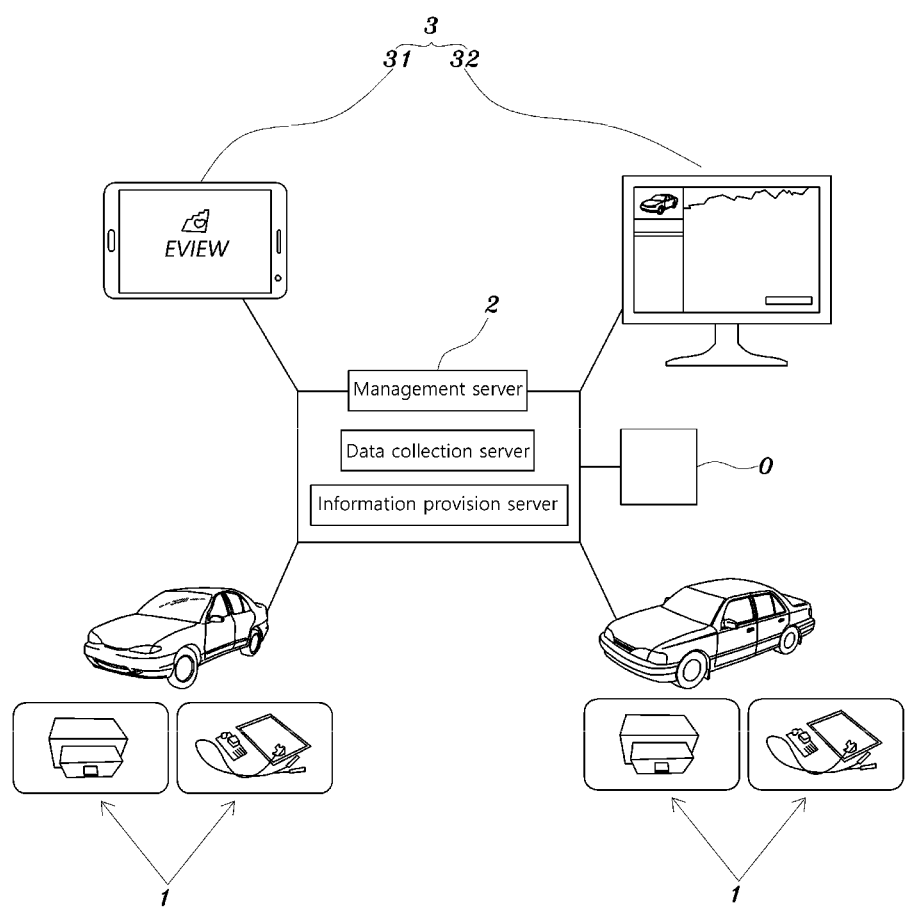

[FIG. 3]
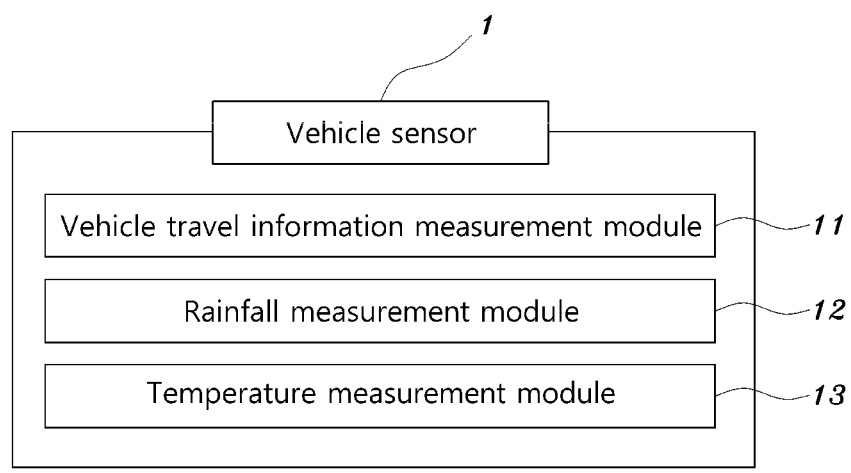

[FIG. 4]
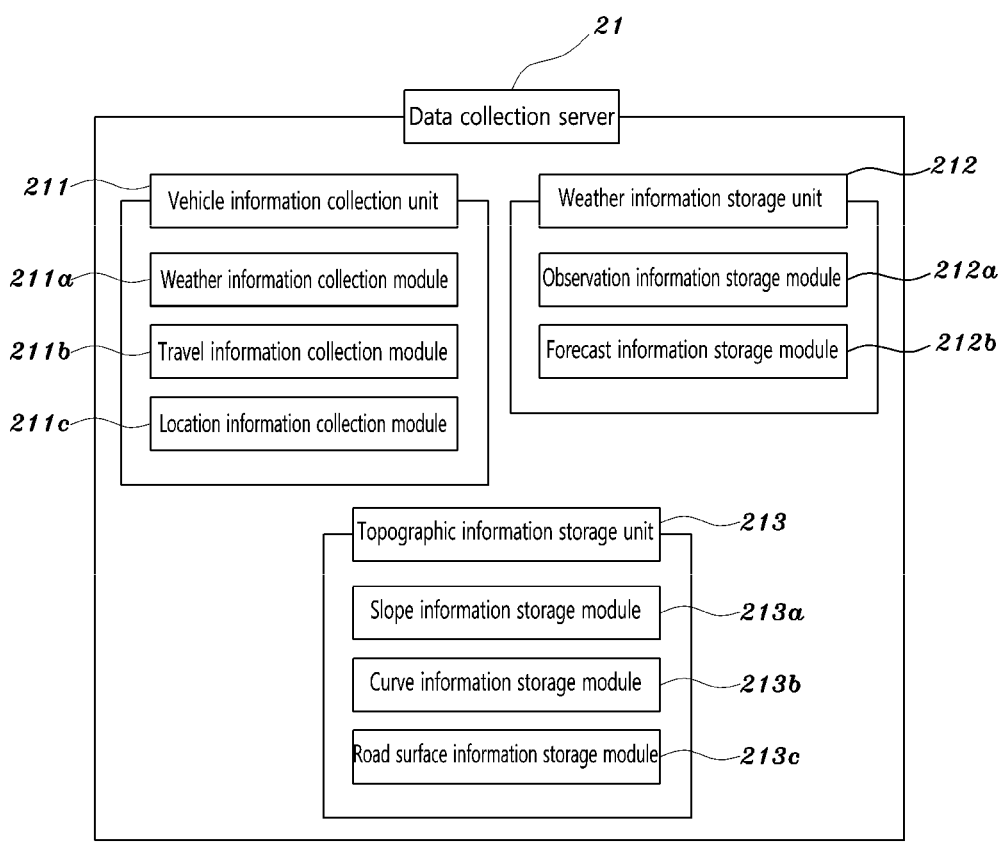

[FIG. 5]
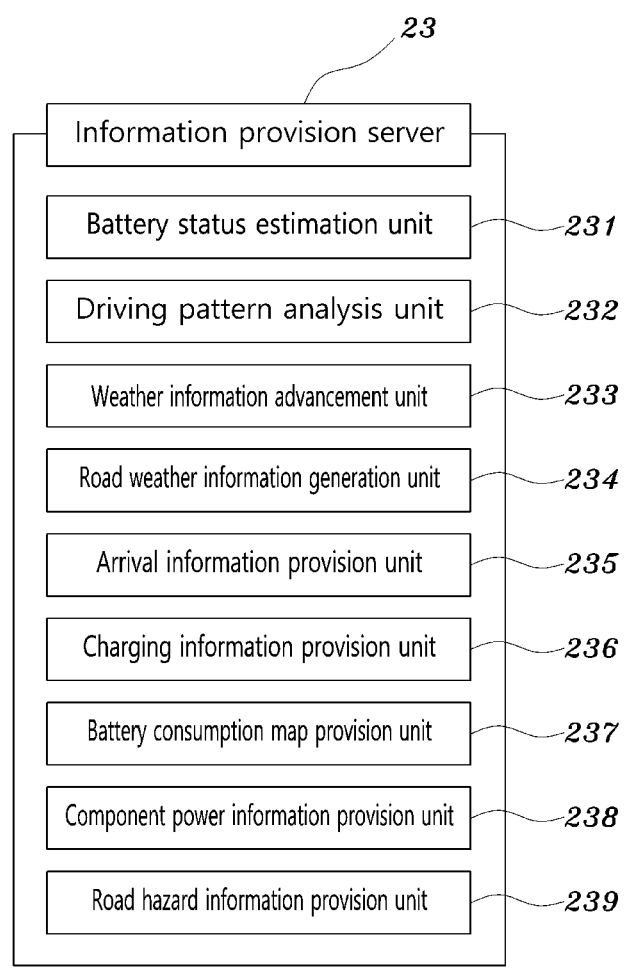

[FIG. 6]
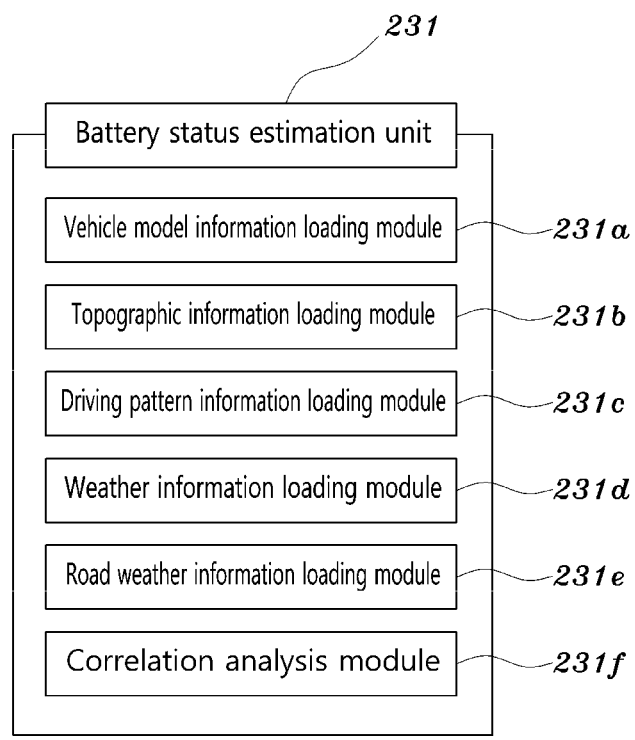

[FIG. 7]
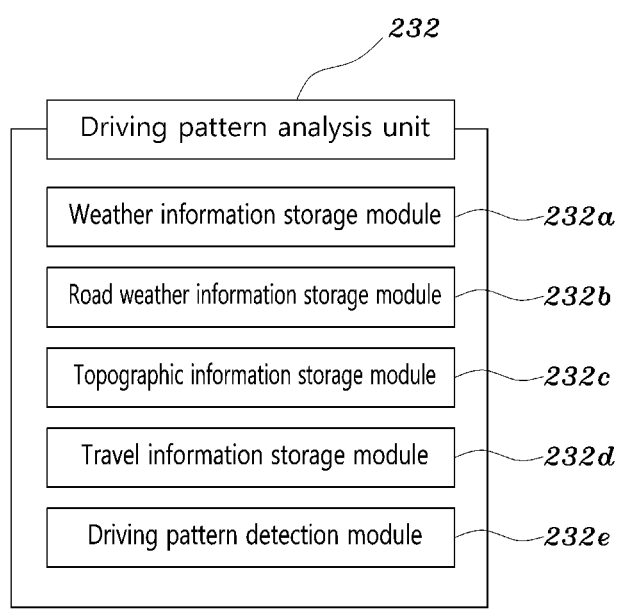

[FIG. 8]
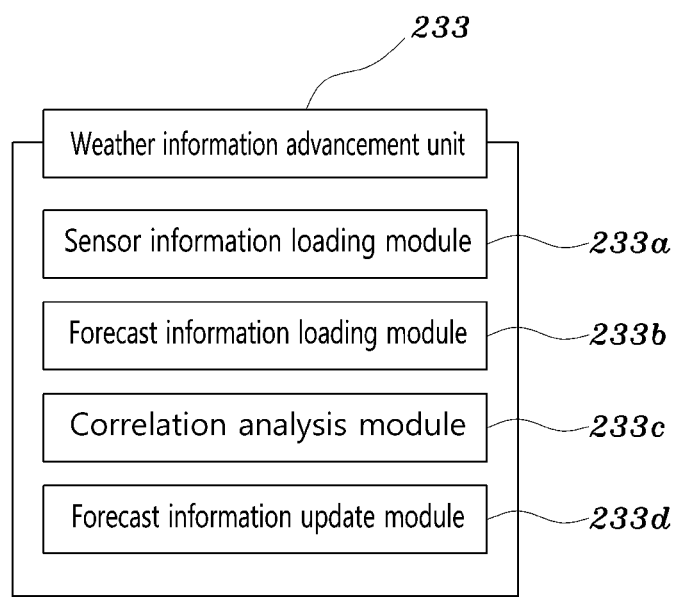

[FIG. 9]
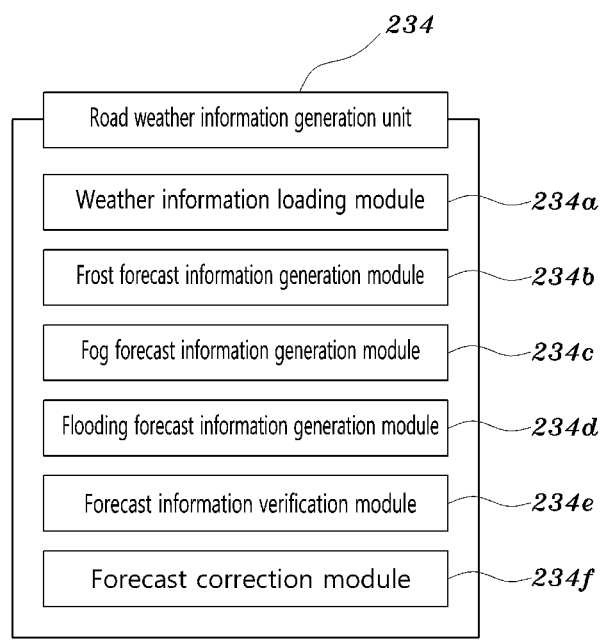

[FIG. 10]
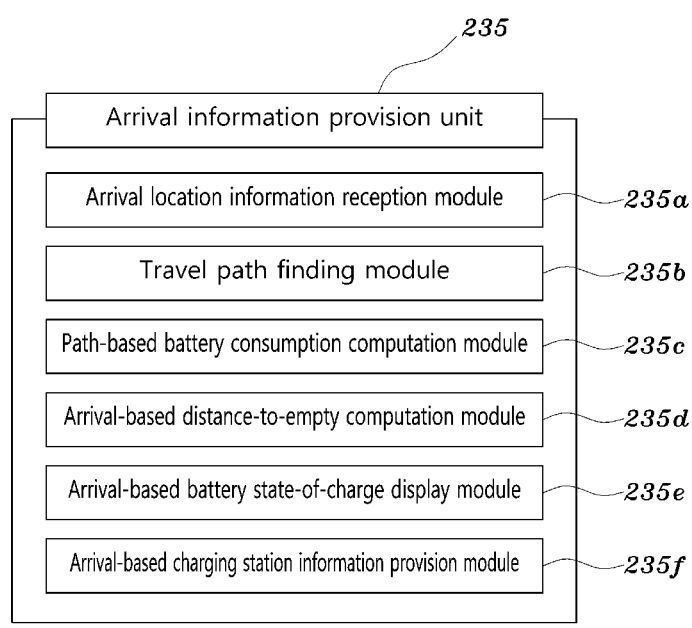

[FIG. 11]
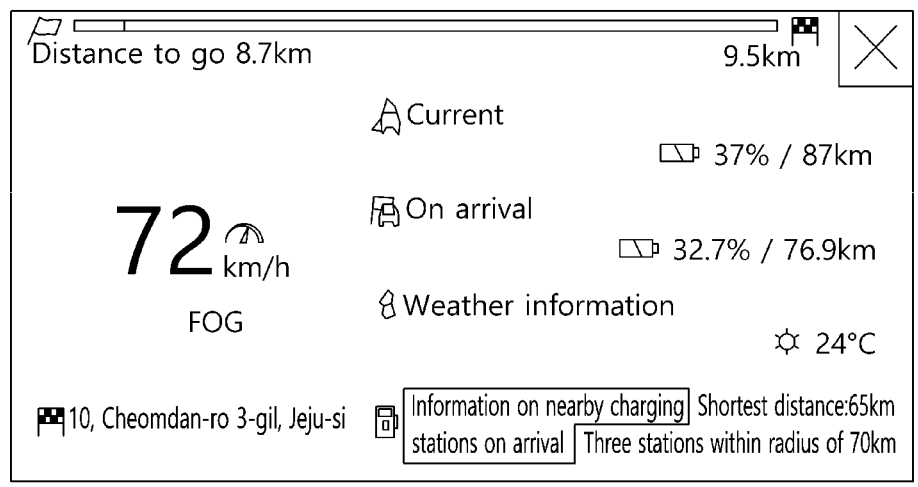

[FIG. 12]
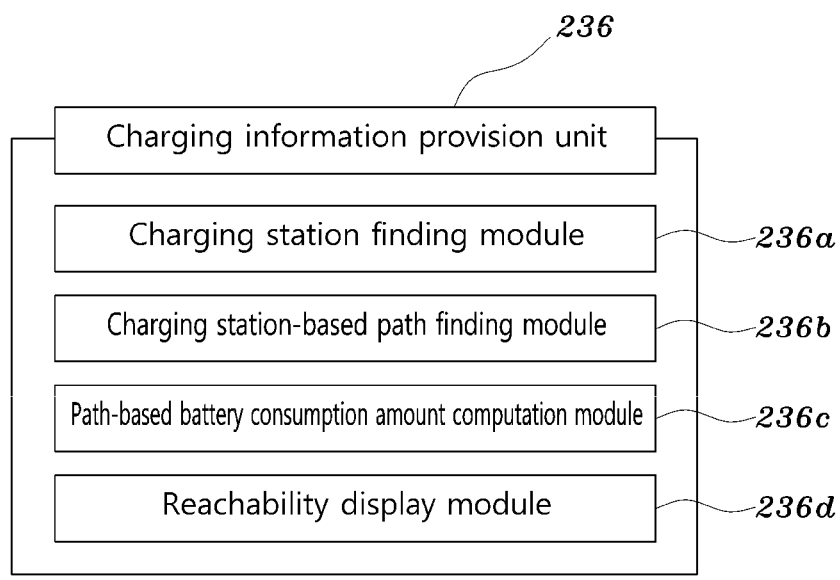

[FIG. 13]
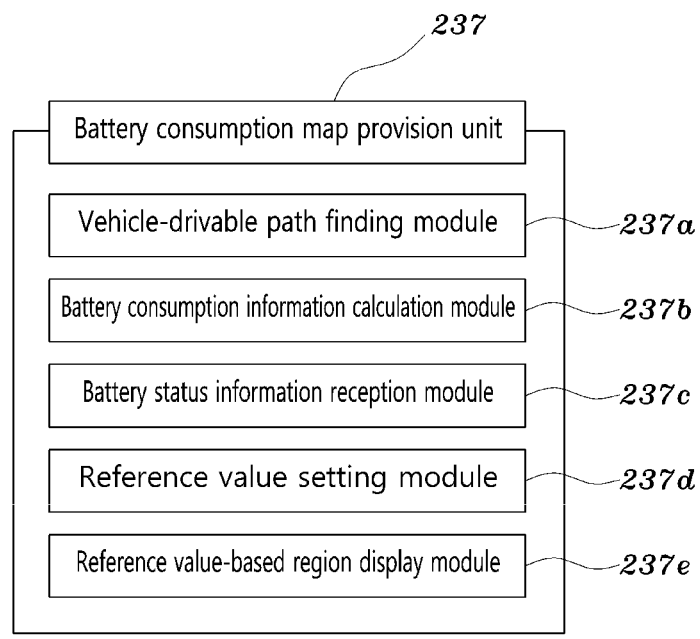

[FIG. 14]
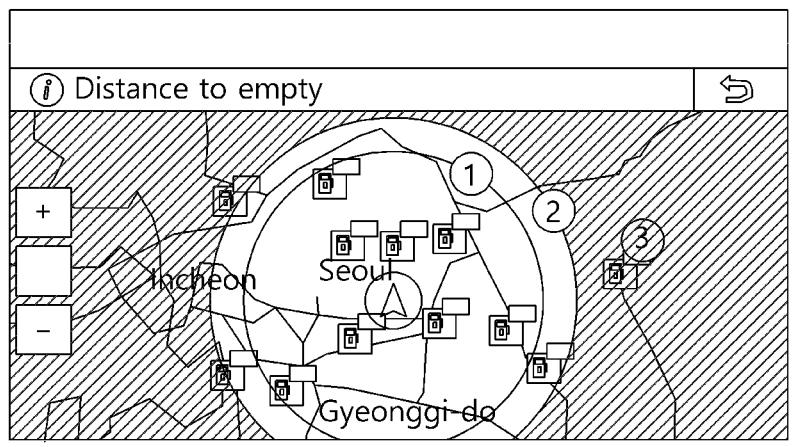

[FIG. 15]
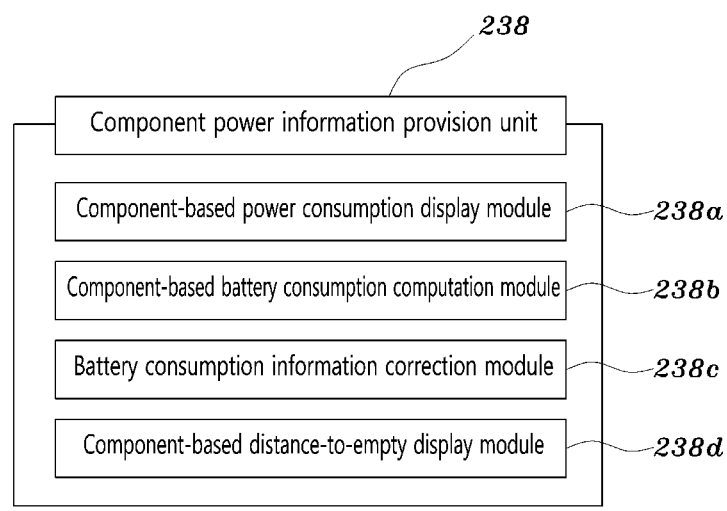

[FIG. 16]

[FIG. 17]
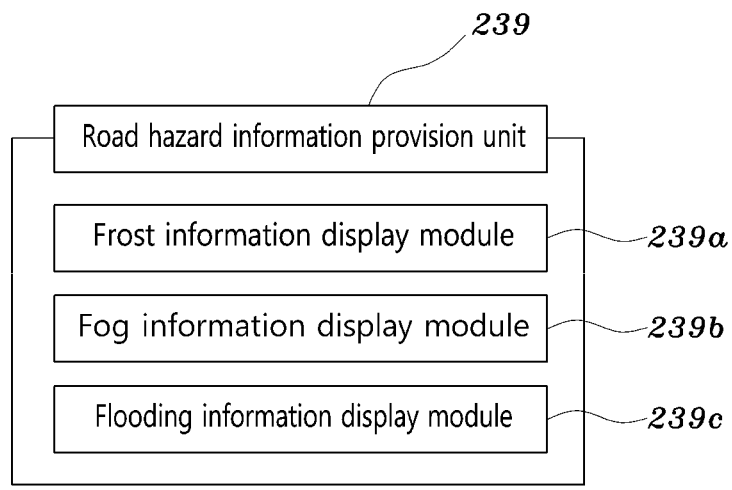

INFORMATION PROVISION SERVICE SYSTEM FOR ELECTRIC VEHICLE USING VEHICLE SENSORS

CROSS-REFERENCE TO RELATED APPLICATIONS

This application claims the benefit under 35 U.S.C. section 371, of PCT International Application No.: PCT/KR2020/012372, filed on Sep. 14, 2020, which claims foreign priority to Korean Patent Application No.: KR10-2019-0150121, filed on Nov. 21, 2019, in the Korean Intellectual Property Office, both of which are hereby incorporated by reference in their entireties.

TECHNICAL FIELD

The present disclosure relates to an information provision service system for an electric vehicle. More particularly, the present disclosure relates to an information provision service system for an electric vehicle using a vehicle sensor, wherein the system estimates a battery status and a distance to empty of an electric vehicle considering weather condition and topographic information based on a path, and estimates a battery status through an analysis of big data by using travel and weather information measured by a vehicle sensor and weather observation and forecast information from outside, thereby achieving accurate estimation.

BACKGROUND ART

With a massive increase in the popularization of vehicles, pollutants have spread, causing serious air pollution. As a solution thereto, interest in pollution-free vehicles has rapidly increased.

Among such pollution-free vehicles, an electric vehicle is a means of transportation that charges the battery by using power supplied from the outside and operates using the battery power. Examples of the electric vehicle include various transportation means using batteries, such as an electric car, an electric scooter, an electric bicycle, and an electric motorcycle (hereinafter, referred to as an "electric vehicle"). Unfortunately, such electric vehicles still lack battery charging facilities, require a long time for charging, and run a shorter distance with the fully charged battery than general vehicles or other transportation means. The batteries frequently run out of power during driving of the vehicles. Therefore, as in Patent Document below, a technology for calculating and providing a distance to empty according to a battery status of an electric vehicle has been developed and used.

However, a battery of an electric vehicle has different characteristics depending on various surrounding environments and weather conditions, and is consumed differently depending on the slope, curve, road surface condition, and the like of the path that the electric vehicle travels. Further, the time that is takes to consume the battery varies depending on a driver's driving habit. Therefore, as shown in FIG. 1, the difference between an estimated distance to empty and an actual distance to empty is at most 85%. Thus, electric vehicles frequently run out of energy on their way to a charging station.

Document of Related Art

Korean Patent Application Publication No. 10-2013-0020468 (published 27 Feb. 2013) "APPARATUS AND METHOD FOR NAVIGATING ELECTRIC VEHICLE"

DISCLOSURE

Technical Problem

Accordingly, the present disclosure has been made keeping in mind the above problems occurring in the related art.

The present disclosure is directed to providing an information provision service system for an electric vehicle, wherein the system estimates and provides a battery status and a distance to empty of an electric vehicle considering weather condition, and topographic information based on a path, so that a battery status and distance to empty can be accurately estimated.

The present disclosure is directed to providing an information provision service system for an electric vehicle, wherein the system collects weather information and travel information of a vehicle by using a vehicle sensor attached to the vehicle, collects observation and forecast weather information from an external weather system, collects and stores topographic information on the slope, curve, and road surface of a vehicle travel path, and computes battery consumption and a distance to empty for the electric vehicle through an analysis of big data of the stored information, thereby more accurately estimating battery consumption and improving the accuracy of forecast information over time.

The present disclosure is directed to providing an information provision service system for an electric vehicle, the system providing customized information specific to a driver.

The present disclosure is directed to providing an information provision service system for an electric vehicle, the system optimizing forecast weather information by using weather information measured by a vehicle sensor, thereby substantially increasing the accuracy of estimation of a battery status and a distance to empty.

The present disclosure is directed to providing an information provision service system for an electric vehicle, the system generating and providing frost, fog, and flooding forecast information that directly affect travel of the electric vehicle, thereby achieving safe travel.

The present disclosure is directed to providing an information provision service system for an electric vehicle, the system being capable of ensuring charging at an arrival point of the vehicle.

The present disclosure is directed to providing an information provision service system for an electric vehicle, the system displaying a reachable range based on estimation of battery consumption on a map with a location of the vehicle in the center, thereby enabling a path and a charging location to be efficiently selected.

The present disclosure is directed to providing an information provision service system for an electric vehicle, the system being capable of adjusting a running distance according to adjustment of operation of a component.

Technical Solution

In order to achieve the objectives above, the present disclosure is realized by an embodiment having the following configurations.

According to an embodiment of the present disclosure, there is provided an information provision service system for an electric vehicle, the information provision service system including: a vehicle sensor with which the vehicle is provided, and measuring travel information of the vehicle and weather information; a management server estimating a battery status and a distance to empty of the electric vehicle by using the information measured by the vehicle sensor, and providing the battery status and the distance to empty; a user terminal receiving estimated information from the management server and displaying the estimated information, wherein the management server estimates the battery status and the distance to empty of the electric vehicle considering battery characteristics based on the weather information.

According to another embodiment of the present disclosure, in the information provision service system for the electric vehicle, the management server may estimate the battery status and the distance to empty of the electric vehicle considering battery consumption characteristics based on topography of a vehicle travel path.

According to still another embodiment of the present disclosure, in the information provision service system for the electric vehicle, the management server may include: a data collection server collecting information for estimating the battery status and the distance to empty; and an information provision server estimating the battery status and the distance to empty by using collected data, and providing the battery status and the distance to empty, wherein the data collection server may include: a vehicle information collection unit collecting and storing therein the weather information, the travel information, and location information measured by the vehicle sensor; a weather information storage unit storing therein observation and forecast weather information received from an external weather system; and a topographic information storage unit storing therein topographic information on a slope, a curve, and a road surface of the vehicle travel path.

According to still another embodiment of the present disclosure, in the information provision service system for the electric vehicle, the information provision server may include a battery status estimation unit estimating battery consumption by analyzing a correlation of the battery consumption with a vehicle model, the topographic information, the weather information, and road weather information directly related to driving of the electric vehicle.

According to still another embodiment of the present disclosure, in the information provision service system for the electric vehicle, the battery status estimation unit may analyze a driving pattern of a driver of the vehicle and may use the driving pattern for an analysis of the correlation of the battery consumption.

According to still another embodiment of the present disclosure, in the information provision service system for the electric vehicle, the information provision server may include a driving pattern analysis unit analyzing the driving pattern of the driver, wherein the driving pattern analysis unit may include: a weather information storage module storing therein the weather information in driving the vehicle; a road weather information storage module storing therein the road weather information directly related to the driving of the electric vehicle; a topographic information storage module storing therein the topographic information on the vehicle travel path; a travel information storage module storing therein the travel information on a speed and acceleration and deceleration of the vehicle; and a driving pattern detection module detecting the driving pattern based on the weather information, the road weather information, and the topographic information.

According to still another embodiment of the present disclosure, in the information provision service system for the electric vehicle, the information provision server may include a weather information advancement unit optimizing weather information forecasted by the external weather system, by using the weather information measured by the vehicle sensor, wherein the weather information advancement unit may include: a sensor information loading module loading the weather information measured by the vehicle sensor; a forecast information loading module loading weather forecast information of the external weather system according to a location of the vehicle sensor; a correlation analysis module deriving the correlation by comparing the weather information loaded by the sensor information loading module and the weather forecast information of the external weather system; and a forecast information update module correcting the weather forecast information according to the derived correlation.

According to still another embodiment of the present disclosure, in the information provision service system for the electric vehicle, the information provision server may include a road weather information generation unit forecasting the road weather information on each road directly related to the driving of the electric vehicle, by using the weather forecast information, wherein the road weather information generation unit may include: a weather information loading module loading the weather forecast information; a frost forecast information generation module, a fog forecast information generation module, and a flooding forecast information generation module forecasting frost, fog, and flooding by using the loaded weather forecast information, respectively; a forecast information verification module comparing the forecasted frost, fog, and flooding with information on frost, fog, and flooding that have actually occurred; and a forecast correction module correcting respective algorithms of the frost forecast information generation module, the fog forecast information generation module, and the flooding forecast information generation module according to a result of verification.

According to still another embodiment of the present disclosure, in the information provision service system for the electric vehicle, the information provision server may include a road hazard information provision unit for displaying the forecasted road weather information on the user terminal.

According to still another embodiment of the present disclosure, in the information provision service system for the electric vehicle, the information provision server may include an arrival information provision unit computing the battery consumption based on a destination of the vehicle through the battery status estimation unit and providing the distance to empty and battery state-of-charge information at the destination, wherein the arrival information provision unit may include: an arrival location information reception module receiving arrival location information from the user terminal; a travel path finding module finding paths between a current location and an arrival location; a path-based battery consumption computation module computing the battery consumption of each of the found paths; an arrival-based distance-to-empty computation module computing and for displaying the distance to empty at an arrival point according to the battery consumption of each of the paths; and an arrival-based battery state-of-charge display module for displaying battery state-of-charge.

According to still another embodiment of the present disclosure, in the information provision service system for the electric vehicle, the arrival information provision unit may include an arrival-based charging station information provision module for displaying charging station information near the arrival location and possibility of reaching a charging station.

According to still another embodiment of the present disclosure, in the information provision service system for the electric vehicle, the information provision server may include a charging information provision unit providing charging station information near a location of the vehicle, wherein the charging information provision unit may include: a charging station finding module finding charging stations near the location of the vehicle; a charging station-based path finding module finding paths to the respective charging stations; a path-based battery consumption amount computation module computing the battery consumption for each of the found paths through the battery status estimation unit; and a reachability display module for displaying possibility of reaching the charging stations through the respective paths considering the battery status of the vehicle.

According to still another embodiment of the present disclosure, in the information provision service system for the electric vehicle, the information provision server may include a battery consumption map provision unit for displaying a vehicle-drivable range based on a current battery status of the vehicle, the battery consumption map provision unit may include: a vehicle-drivable path finding module finding vehicle-drivable paths with a current location of the vehicle in the center; a battery consumption information calculation module computing battery consumption information for each of the paths through the battery status estimation unit; a battery status information reception module receiving information on the current battery status of the vehicle; a reference value setting module setting a reference value for battery state-of-charge; and a reference value-based region display module for displaying a vehicle-drivable region based on the set reference value.

According to still another embodiment of the present disclosure, in the information provision service system for the electric vehicle, the information provision server may include a component power provision unit computing the battery consumption considering power consumption for each component of the vehicle, wherein the component power provision unit may include: a component-based power consumption display module for displaying the power consumption for each component; a component-based battery consumption computation module computing an influence of each component on the battery consumption; a battery consumption information correction module correcting battery consumption information based on the driving of the vehicle according to a stop of operation of each component; and a component-based distance-to-empty display module for displaying the distance to empty according to corrected battery consumption.

Advantageous Effects

According to the above-described embodiments and the following features, combinations, and relations of use that will be described later, the present disclosure has the following effects.

The present disclosure estimates and provides a battery status and a distance to empty of an electric vehicle considering weather condition and topographic information based on a path, so that an accurate estimation of a battery status and a distance to empty can be achieved.

The present disclosure collects weather information and travel information of a vehicle by using a vehicle sensor attached to the vehicle, collects observation and forecast weather information from an external weather system, collects and stores topographic information on the slope, curve, and road surface of a vehicle travel path, and computes battery consumption and a distance to empty for the electric vehicle through an analysis of big data of the stored information, so that battery consumption can be more accurately estimated and the accuracy of forecast information over time can be improved.

The present disclosure estimates battery consumption considering a driving pattern of a driver, so that customized information specific to the driver can be provided.

The present disclosure optimizes forecast weather information by using weather information measured by a vehicle sensor, so that the accuracy of estimation of a battery status and a distance to empty can be substantially increased.

The present disclosure generates and provides frost, fog, and flooding forecast information that directly affect driving of the electric vehicle, so that safe driving can be achieved.

The present disclosure computes and provides battery state-of-charge and a distance to empty at an arrival point of the vehicle, so that charging after arrival can be prepared.

The present disclosure displays charging station information near an arrival point and the possibility of reaching a charging station, so that charging after arrival can be ensured.

The present disclosure displays charging station information near a location of the vehicle, and the possibility of reaching a charging station based on estimation of battery consumption, so that charging can be ensured.

The present disclosure displays a reachable range based on estimation of battery consumption on a map with a location of the vehicle in the center, so that a path and a charging location can be efficiently selected.

The present disclosure computes power consumed for each component of the vehicle, and computes and displays the change in battery consumption according to the stop of operation of the components, so that a running distance according to adjustment of operation of a component can be adjusted.

DESCRIPTION OF DRAWINGS

FIG. 1 is a graph illustrating seasonal error rates in running distance estimation in the related art.

FIG. 2 is a configuration diagram illustrating an information provision service system for an electric vehicle using a vehicle sensor according to an embodiment of the present disclosure.

FIG. 3 is a block diagram illustrating a configuration of the vehicle sensor of FIG. 2.

FIG. 4 is a block diagram illustrating a configuration of a data collection server of FIG. 2.

FIG. 5 is a block diagram illustrating a configuration of an information provision server of FIG. 2.

FIG. 6 is a block diagram illustrating a configuration of a battery status estimation unit of FIG. 5.

FIG. 7 is a block diagram illustrating a configuration of a driving pattern analysis unit of FIG. 5.

FIG. 8 is a block diagram illustrating a configuration of a weather information advancement unit of FIG. 5.

FIG. 9 is a block diagram illustrating a configuration of a road weather information generation unit of FIG. 5.

FIG. 10 is a block diagram illustrating a configuration of an arrival information provision unit of FIG. 5.

FIG. 11 is a reference diagram illustrating an example of a display provided to a user terminal by the arrival information provision unit of FIG. 10.

FIG. 12 is a block diagram illustrating a configuration of a charging information provision unit of FIG. 5.

FIG. 13 is a block diagram illustrating a configuration of a battery consumption map provision unit of FIG. 5.

FIG. 14 is a reference diagram illustrating an example of a display provided to a user terminal by the battery consumption map provision unit of FIG. 13.

FIG. 15 is a block diagram illustrating a configuration of a component power information provision unit of FIG. 5.

Figure 16:
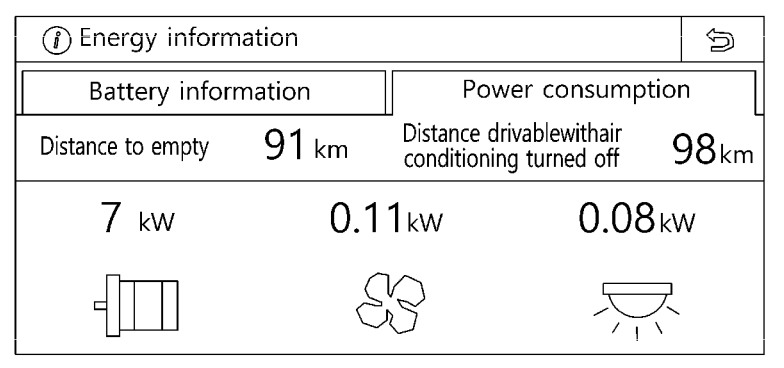

FIG. 16 is a reference diagram illustrating an example of a display provided to a user terminal of a component power information provision unit of FIG. 15.

FIG. 17 is a block diagram illustrating a configuration of a road hazard information provision unit of FIG. 5.

DESCRIPTION OF THE REFERENCE NUMERALS IN THE DRAWINGS

1: vehicle sensor 11: vehicle travel information measurement module 12: rainfall measurement module 13: temperature measurement module 2: management server 21: data collection server 211: vehicle information collection unit 212: weather information storage unit 213: topographic information storage unit 23: information provision server 231: battery status estimation unit 232: driving pattern analysis unit 233: weather information advancement unit 234: road weather information generation unit 235: arrival information provision unit 236: charging information provision unit 237: battery consumption map provision unit 238: component power information provision unit 239: road hazard information provision unit 3: user terminal 31: driver terminal 32: operator terminal

BEST MODE

Hereinafter, an information provision service system for an electric vehicle using a vehicle sensor according to exemplary embodiments of the present disclosure will be described in detail with reference to the accompanying drawings. In describing the present disclosure, it is to be noted that if a detailed description of the known function or configuration makes the subject matter of the present disclosure unclear, the detailed description will be omitted. Throughout the specification, when a part "includes" an element, it is noted that it further includes other elements, but does not exclude other elements, unless specifically stated otherwise. In addition, the terms "~part", "~module", and the like mean a unit for processing at least one function or operation and may be implemented by hardware or software or a combination thereof.

Referring to FIGS. 2 to 17, an information provision service system for an electric vehicle using a vehicle sensor according to an embodiment of the present disclosure includes: a vehicle sensor 1 with which the vehicle is provided, and measuring travel information of the vehicle and weather information; a management server 2 estimating a battery status and a distance to empty of the electric vehicle by using the information measured by the vehicle sensor 1, and providing the battery status and the distance to empty; and a user terminal 3 receiving estimated information from the management server 2 and displaying the received information.

As described above in Background Art, a running distance estimation system for an electric vehicle in the related art estimates battery consumption considering only a status or fuel efficiency characteristics of a battery, and estimates a distance to empty at the current location in accordance with the battery consumption. However, the consumption characteristics of the battery of the electric vehicle vary greatly according to temperature, vary according to a road surface condition based on weather conditions, and also vary according to a driving pattern of the driver and the topography, such as the slope and curve of a road. Therefore, in the present disclosure, battery consumption is estimated considering weather information, topographic information, and a driver pattern. To this end, information on these is collected to form big data, and through an analysis of correlation between battery consumption and the information, battery consumption is estimated according to each variable. In particular, according to the present disclosure, a vehicle sensor 1 attached to a vehicle measures and collects travel information of the vehicle, and collects weather information on the temperature near the vehicle, and on the amount of rainfall so as to optimize the weather information for more accurate estimation, whereby more accurate estimation of battery consumption and a distance to empty is achieved.

The vehicle sensor 1 is attached to the vehicle and measures travel information of the vehicle and nearby weather information. The vehicle sensor 1 transmits the measured information to the management server 2 for collection. The vehicle sensor 1 may include a vehicle travel information measurement module 11 measuring travel information of a vehicle, and may collect various types of weather information. In the present disclosure, the vehicle sensor 1 may include a rainfall measurement module 12 and a temperature measurement module 13 for measuring temperature and rainfall information. The rainfall measurement module 12 and the temperature measurement module 13 are attached to an electric vehicle as well as a general vehicle so that weather information is measured and collected.

The vehicle travel information measurement module 11 is attached to each vehicle and measures travel information of the vehicle. The vehicle travel information measurement module 11 transmits Information on a vehicle model and a battery type and information for identifying a driver, and also measures and transmits information on a battery status, a running path, a speed, acceleration and deceleration of the vehicle.

The rainfall measurement module 12 measures and transmits rainfall information, and a rainfall measurement sensor provided for operation of vehicle wipers may be applied as an example. Therefore, as the rainfall measurement module 12, various sensor devices measuring the amount of rainfall by an optical sensor may be applied. The rainfall measurement module 12 measures information on the amount of rainfall at regular time intervals and transmits the information to the management server 2.

The temperature measurement module 13 measures and transmits the temperature near a vehicle, and may measure the temperature at regular time intervals together with the amount of rainfall and may transmit the same to the management server 2.

The management server 2 estimates and provides a battery status and a distance to empty of an electric vehicle. The management server 2 may include: a data collection server 21 collecting data for such estimation; and an information provision server 23 estimating and providing a battery status and a distance to empty by analyzing the collected data.

The data collection server 21 collects information for estimation of a battery status and a distance to empty. The data collection server 21 may include: a vehicle information collection unit 211 collecting information from the vehicle sensor 1; a weather information storage unit 212 collecting weather information from an external weather system (O) and storing the same therein; and a topographic information storage unit 213 storing therein topographic information on a road.

The vehicle information collection unit 211 collects and stores therein information measured by the vehicle sensor 1. The vehicle information collection unit 211 may include: a weather information collection module 211*a* collecting weather information on temperature and rainfall; a travel information collection module 211*b* collecting information on a battery status, a running path, a speed, and acceleration and deceleration of the vehicle; and a location information collection module 211*c* collecting location information of the vehicle. Therefore, the vehicle information collection unit 211 collects weather information and travel information for each location of the vehicle so as to form big data, and through this, the battery consumption characteristics according to the weather information, running path, and running pattern may be determined.

The weather information storage unit 212 collects weather information from the external weather system (O), for example, a weather center, and an automatic weather station (AWS), and stores the same. The weather information storage unit 212 may include an observation information storage module 212*a* storing the current weather condition therein, and a forecast information storage module 212*b* storing weather forecast information therein. The observation and forecast weather information stored in the observation information storage module 212*a* and the forecast information storage module 212*b* are used to advance weather information, together with weather information measured by the vehicle sensor 1. The advanced weather information is used in estimating a battery status and a running distance so as to increase the accuracy of estimation.

The topographic information storage unit 213 stores topographic information on a road therein, and may store various types of topographic information that might affect the battery consumption characteristics of the electric vehicle. The topographic information storage unit 213 may include a slope information storage module 213*a*, a curve information storage module 213*b*, and a road surface information storage module 213*c* that store therein slope information, curve information, and road surface information, respectively, for example.

The information provision server 23 estimates battery consumption by using the weather information, the topographic information, and the travel information stored in the data collection server 21, and computes and provides a distance to empty in accordance with the battery consumption. In particular, the information provision server 23 analyzes the battery consumption characteristics according to types of vehicle and battery, topography, a driving pattern, weather information, and road weather information so as to estimate battery consumption depending on a path. In addition, the information provision server 23 analyzes a driving pattern of the driver, advances weather information, and generates forecast information on road weather directly related to driving of the electric vehicle so that the accuracy of estimation of battery consumption is improved. In addition, the information provision server 23 is for displaying a distance to empty with a destination in the center, battery state-of-charge information, nearby charging station information, and the possibility of reaching a charging station that are based on estimation of battery consumption, whereby an accident that the electric vehicle is not charged is prevented. In addition, the information provision server 23 provides a battery consumption map with a driver in the center so that a travel path and a charging location are planned in advance. The information provision server 23 also provides power consumption information for each component of the vehicle for efficient driving, and is for displaying hazard weather information on a road for safe driving of the electric vehicle. To this end, the information provision server may include, as shown in FIG. 5, a battery status estimation unit 231, a driving pattern analysis unit 232, a weather information advancement unit 233, a road weather information generation unit 234, an arrival information provision unit 235, a charging information provision unit 236, a battery consumption map provision unit 237, a component power information provision unit 238, and a road hazard information provision unit 239.

The battery status estimation unit 231 analyzes the battery consumption characteristics according to types of vehicle and battery, topography, a driving pattern, weather information, and road weather information. The battery status estimation unit 231 analyzes the big data collected and stored by the data collection server 21, by using a machine learning technique, so that a correlation of the battery consumption characteristics with types of vehicle and battery, topography, a driving pattern, weather information, and road weather information is derived. The battery status estimation unit 231 may estimate a current distance to empty considering the current status of the battery and weather information. More preferably, the battery status estimation unit 231 may analyze the battery consumption characteristics considering topography, a driving pattern, and weather information for a predetermined path from the current location of the vehicle, and estimates battery consumption in accordance with the battery consumption characteristics. To this end, the battery status estimation unit 231 may include a vehicle model information loading module 231*a*, a topographic information loading module 231*b*, a driving pattern information loading module 231*c*, a weather information loading module 231*d*, a road weather information loading module 231*e*, and a correlation analysis module 231*f*.

The vehicle model information loading module 231*a* loads information on a type of vehicle and a type of battery, and is for inputting the characteristics according to the type of vehicle and the type of battery as variables for estimation of battery consumption.

The topographic information loading module 231*b* loads topographic information on a vehicle travel path, and may load information such as slope, curve, and road surface information. The topographic information loading module 231*b* may classify the topographic information according to degrees of slope and curve, and the roughness of a road surface condition, such as an unpaved or paved road, so that the topographic information is used in analyzing a correlation with battery consumption.

The driving pattern information loading module 231*c* loads information on a driving pattern of each driver, and loads information analyzed and stored by the driving pattern analysis unit 232. The driving pattern information loaded by the driving pattern information loading module 231*c* may include a driving speed of a driver, and degrees of acceleration and deceleration according to each environment, and the battery consumption characteristics in accordance with the driving pattern information are analyzed.

The weather information loading module 231*d* loads the weather information measured by the vehicle sensor 1, so that the weather information is used in analyzing a correlation with battery consumption. Therefore, the weather information loading module 231*d* is for using the weather information directly measured by the vehicle sensor 1 in a correlation analysis, thus enabling a more accurate analysis of battery consumption.

The road weather information loading module 231e loads road weather information directly related to the driving of the electric vehicle, and may load observation information related to frost, fog, and flooding. In addition, the road weather information loading module 231e expresses a numerical value according to each piece of the road weather information, for example, information on frost, fog, and flooding, so that a correlation with battery consumption is analyzed.

The correlation analysis module 231f analyzes a correlation of the battery consumption characteristics with types of vehicle and battery, topographic information, driving pattern information, weather information, and road weather information loaded by the vehicle model information loading module 231a, the topographic information loading module 231b, the driving pattern information loading module 231c, the weather information loading module 231d, and the road weather information loading module 231e, respectively. The correlation analysis module 231f is for deriving a correlation equation according to each variable. The correlation analysis module 231f may use various machine learning techniques, such as a decision tree, logistic regression, and a random forest, and may be for deriving a correlation equation by the technique having the highest accuracy.

The driving pattern analysis unit 232 analyzes a driving pattern of each driver, and analyzes travel information on a vehicle speed of a driver, acceleration, and deceleration according to weather, road weather, and topographic information. To this end, the driving pattern analysis unit 232 may include a weather information storage module 232a, a road weather information storage module 232b, a topographic information storage module 232c, a travel information storage module 232d, and a driving pattern detection module 232e.

The weather information storage module 232a, the road weather information storage module 232b, and the topographic information storage module 232c store therein weather information, road weather information, and topographic information on the path that a driver has travelled, respectively, and are for analyzing a driving pattern in accordance with such information.

The travel information storage module 232d stores therein information on a vehicle travel speed of a driver, the degree of acceleration, and the degree of deceleration, and is for analyzing connection with weather information, road weather information, and topographic information.

The driving pattern detection module 232e detects a driving pattern of a user according to weather information, road weather information, and topographic information. The driving pattern detection module 232e is for analyzing information on the speed at which a driver drives a vehicle and on the degrees of acceleration and deceleration, according to each environment. The driver's driving pattern detected by the driving pattern detection module 232e is transmitted to the battery status estimation unit 231 and is loaded by the driving pattern information loading module 231c. The driving pattern is input as a variable for estimation of battery consumption so that estimation of battery consumption optimized for each driver is achieved.

The weather information advancement unit 233 improves the accuracy of forecast weather information by using weather information measured by the vehicle sensor 1. The weather information advancement unit 233 corrects forecast information by comparing the weather forecast information provided by the external weather system (O) and the weather information measured by the vehicle sensor 1, thereby increasing the accuracy of forecast of weather information. Regarding the weather information forecasted by the external weather system (O), weather factors all points are unable to be measured, and the accuracy of the weather information is low because of various variables. Therefore, the forecasted weather information is corrected using weather information of the vehicle sensor 1 measuring weather information at a particular location, thereby increasing the accuracy of the forecasted weather information. To this end, the weather information advancement unit 233 may include a sensor information loading module 233a, a forecast information loading module 233b, a correlation analysis module 233c, and a forecast information update module 233d.

The sensor information loading module 233a loads the weather information measured and stored by the vehicle sensor 1, and may load, for example, information on temperature, and the amount of rainfall.

The forecast information loading module 233b loads forecast weather information for the location measured by the vehicle sensor 1, and loads information forecasted by the external weather system O.

The correlation analysis module 233c compares weather information measured at a particular location by vehicle sensor 1 and weather information forecasted by the external weather system (O) so as to analyze a correlation therebetween. The correlation analysis module 233c analyzes big data accumulated for a predetermined time and derives a correlation.

The forecast information update module 233d corrects the forecasted weather information according to the correlation analyzed by the correlation analysis module 233c, and is for applying the corrected forecast weather information when battery consumption and a running distance are estimated by the arrival information provision unit 235, the charging information provision unit 236, and the battery consumption map provision unit 237.

The road weather information generation unit 234 generates, by using weather forecast information, road weather information directly related to the driving of the electric vehicle, for example, forecast information on frost, fog, and flooding, and provides the same. The road weather information generation unit 234 is for displaying hazard information on a road on the user terminal 3 through the road hazard information provision unit 239. In addition, the road weather information generation unit 234 compares information on occurrence of actual frost, fog, and flooding and forecast information so that each estimation algorithm is corrected, thereby improving the accuracy of forecasting over time. To this end, the road weather information generation unit 234 may include a weather information loading module 234a, a frost forecast information generation module 234b, a fog forecast information generation module 234c, a flooding forecast information generation module 234d, a forecast information verification module 234e, and a forecast correction module 234f.

The weather information loading module 234a loads weather forecast information, and may load the forecast weather information stored by the forecast information storage module 212b and the weather information optimized by the weather information advancement unit 233 together.

The frost forecast information generation module 234b forecasts frost on a road, and may forecast frost according to the amount of rainfall, temperature, and wind velocity. If frost at a predetermined reference level or more occurs, the frost forecast information generation module 234b generates frost forecast information and makes it to be displayed as hazard information.

The fog forecast information generation module 234c forecasts fog occurring on a road, and may make forecast using weather forecast information, such as temperature, road surface temperature, humidity, atmospheric pressure, wind velocity, and solar irradiation. The fog forecast information generation module 234c may be for performing forecast through a neural network, for example.

The flooding forecast information generation module 234d forecasts occurrence of road flood. The flooding forecast information generation module 234d may forecast flooding using rainfall information, and may generate flooding forecast information by analyzing a causal relationship between a particular road, the amount of rainfall, and the possibility of flooding through a machine learning technique. In particular, flooding may have a serious effect on the battery of the electric vehicle, and thus has a strict reference level. If flooding occurs to the degree that may affect the battery of the electric vehicle, hazard information is displayed on the user terminal 3.

The arrival information provision unit 235 estimates battery consumption for each travel path, providing travel paths for a particular destination. In particular, as shown in FIG. 11, the arrival information provision unit 235 is for displaying a distance to empty and battery stage-of-charge at a destination, so that a vehicle state after reaching the destination is accurately determined. In addition, the arrival information provision unit 235 computes and provides a charging station near an arrival point and the possibility of reaching the charging station, thereby preventing the problem of difficulty in charging after arrival. To this end, the arrival information provision unit 235 may include an arrival location information reception module 235a, a travel path finding module 235b, a path-based battery consumption computation module 235c, an arrival-based distance-to-empty computation module 235d, an arrival-based battery state-of-charge display module 235e, and an arrival-based charging station information provision module 235f.

The arrival location information reception module 235a receives information on an arrival location input through the user terminal 3. For example, the arrival location information reception module 235a enables a driver to set and input a destination through the driver terminal 31, and receives information on the destination.

The travel path finding module 235b finds paths from the current location of the vehicle to a destination, wherein a predetermined number of paths that the vehicle is able to travel may be found in order of required time.

The path-based battery consumption computation module 235c computes battery consumption estimated for each path found by the travel path finding module 235b. The path-based battery consumption computation module 235c may compute battery consumption by inputting, to the correlation equation derived by the battery status estimation unit 231, a vehicle model and battery information with topographic information, weather information, road weather information for each path, and driving pattern information of the driver. Accordingly, the path-based battery consumption computation module 235c computes battery consumption considering the vehicle model and the battery type with topography, weather condition, and road weather information for the path and according to the driving pattern of the driver, whereby more accurate estimation of battery consumption is achieved.

The arrival-based distance-to-empty computation module 235d computes and provides a distance to empty on arrival at a destination. By using the current battery status of the vehicle and the battery consumption computed by the path-based battery consumption computation module 235c, the arrival-based distance-to-empty computation module 235d computes battery state-of-charge and is for displaying a distance to empty in accordance with the battery state-of-charge.

The arrival-based battery state-of-charge display module 235e is for displaying battery state-of-charge on arrival on the user terminal 3, wherein the battery state-of-charge on arrival is calculated by subtracting estimated battery consumption from the current battery state-of-charge.

The arrival-based charging station information provision module 235f provides information on a nearby charging station that is reachable on the basis of the battery state-of-charge at an arrival point. The arrival-based charging station information provision module 235f forecasts weather condition near an arrival point and is for displaying the possibility of reaching the charging station considering the battery consumption computed by the charging information provision unit 236.

The charging information provision unit 236 provides charging station information near the vehicle, and may be used in providing the information on a charging station near an arrival point by the arrival-based charging station information provision module 235f. The charging information provision unit 236 estimates battery consumption for each charging station considering the battery consumption characteristics based on weather condition by the battery status estimation unit 231, and is for displaying the possibility of reaching each charging station according to the estimated battery consumption. To this end, the charging information provision unit 236 includes a charging station finding module 236a, a charging station-based path finding module 236b, and a path-based battery consumption amount computation module 236c.

The charging station finding module 236a fines a charging station near the location of the vehicle, wherein an electric vehicle charging station within a predetermined distance is found.

The charging station-based path finding module 236b finds, for each charging station, paths that the vehicle is able to travel, wherein a predetermined number of paths are found and displayed.

The path-based battery consumption amount computation module 236c computes battery consumption estimated for each path found by the charging station-based path finding module 236b. According to the correlation equation derived by the battery status estimation unit 231, the battery consumption is computed considering topography, weather, road weather information, and driving pattern information for each path.

The reachability display module 236d is for displaying the possibility of reaching each charging station according to each path, and may be for displaying the possibility of reaching each charging station, considering both the current battery status of the vehicle and the battery consumption computed by the path-based battery consumption amount computation module 236c. For example, when travel to the path takes place, the reachability display module 236d divides grades according to battery state-of-charge and is for displaying the grades as danger, warning, and safety.

The battery consumption map provision unit 237 is for displaying a region that the vehicle is able to reach, on a map considering the estimated battery consumption. With the current location of the vehicle in the center, battery consumption for each path is estimated and the region is displayed according to battery state-of-charge. To this end, the battery consumption map provision unit 237 may include a vehicle-drivable path finding module 237a, a battery consumption information calculation module 237b, a battery status information reception module 237c, a reference value setting module 237d, and a reference value-based region display module 237e.

The vehicle-drivable path finding module 237a finds the path that the vehicle is able to travel, with the location of the vehicle in the center. All paths connected to the location of the vehicle within a predetermined distance are found.

The battery consumption information calculation module 237b estimates battery consumption for each path found by the vehicle-drivable path finding module 237a, and estimates battery consumption according to the correlation equation derived by the battery status estimation unit 231.

The battery status information reception module 237c receives battery status information of the vehicle, so that a vehicle-drivable distance is computed according to battery state-of-charge information.

The reference value setting module 237d sets a reference value for battery state-of-charge considering the current state of charge of the battery of the vehicle and battery consumption estimated for each path. For example, as shown in FIG. 14, a reference value may be set in such a manner that regions ①, ②, and ③ are divided according to battery state-of-charge.

The reference value-based region display module 237e is for displaying each region on a map according to a reference value of battery state-of-charge. As shown in FIG. 14, regions ①, ②, and ③ are displayed. Herein, as it goes from region ① to region ③, battery state-of-charge decreases, whereby the driver is able to accurately determine the region that the vehicle is able to reach.

The component power information provision unit 238 determines power consumption for each component of the vehicle so that battery consumption and a distance to empty are computed according to whether the components operate. Considering these, the driver is able to adjust whether to operate a component. To this end, the component power information provision unit 238 may include a component-based power consumption display module 238a, a component-based battery consumption computation module 238b, a battery consumption information correction module 238c, and a component-based distance-to-empty display module 238d.

The component-based power consumption display module 238a is for displaying power consumption according to the operation of each component of the vehicle, for example, an air conditioning device, an electronic component, and a light. Considering the power consumption of each component, power consumed by each component is displayed as shown in FIG. 16.

The component-based battery consumption computation module 238b computes the amount of charge of the battery consumed in running on each path according to the power consumption of each component. The battery consumption caused by each component is computed when battery consumption is estimated by the arrival information provision unit 235, the charging information provision unit 236, and the battery consumption map provision unit 237.

The battery consumption information correction module 238c computes the battery consumption estimated if the power of each component is turned off. The battery consumption may be computed by subtracting battery consumption of each component from the existing battery consumption.

The component-based distance-to-empty display module 238d is for displaying a distance to empty that increases if operation of a component is stopped, according to the battery consumption computed by the battery consumption information correction module 238c. Considering the distance to empty, the driver is able to determine whether to operate a component.

The road hazard information provision unit 239 is for displaying, on a map, information on a road dangerous to drive the electric vehicle. When the road weather information forecasted by the road weather information generation unit 234 exceeds a predetermined hazard level, information on this is displayed on the user terminal 3. The road hazard information provision unit 239 may include a frost information display module 239a, a fog information display module 239b, and a flooding information display module 239c for displaying information on frost, fog, and flooding, respectively. When frost, fog, or flooding occurs to the degree that interferes with the driving of the electric vehicle, the road hazard information provision unit 239 makes hazard information to be displayed on each path acquired by the arrival information provision unit 235, the charging information provision unit 236, and the battery consumption map provision unit 237, thereby achieving safety driving of the electric vehicle.

The user terminal 3 displays the information provided from the management server 2 on a screen. As the user terminal 3, various devices capable of being connected to the management server 2 through wired/wireless communication may be applied, for example, a smartphone, a tablet PC, and a personal computer (PC). Examples of the user terminal 3 include a driver terminal 31 and an operator terminal 32. The driver terminal 31 is a terminal that the driver of the vehicle carries. The driver terminal 31 is for displaying, on a screen, pieces of information acquired on the basis of estimation of battery consumption by the arrival information provision unit 235, the charging information provision unit 236, the battery consumption map provision unit 237, the component power information provision unit 238, and the road hazard information provision unit 239. In addition, the operator terminal 32 may be for displaying the same information as the driver terminal 31 displays. However, the operator terminal 32 may be carried by the manager of a rental car company, logistics company, or transportation company to manage travel states of vehicles.

Although the application has described various embodiments of the present disclosure, the embodiments are only embodiments that realize the technical idea of the present disclosure. Any changes or modifications that realize the technical idea of the present disclosure should be construed as belonging to the scope of the present disclosure.

The invention claimed is:

1. An information provision service system for an electric vehicle, the information provision service system comprising:
   a vehicle sensor with which the vehicle is provided, and measuring both travel information of the vehicle and weather information;
   a management server estimating both a battery status and a distance to empty of the electric vehicle by using the information measured by the vehicle sensor, and providing the battery status and the distance to empty;

a user terminal receiving estimated information from the management server and displaying the estimated information, wherein the management server estimates the battery status and the distance to empty of the electric vehicle considering battery characteristics based on the weather information, wherein the management server estimates the battery status and the distance to empty of the electric vehicle considering battery consumption characteristics based on topography of a vehicle travel path, wherein the management server comprises: a data collection server collecting information for estimating the battery status and the distance to empty; and an information provision server estimating the battery status and the distance to empty by using collected data, and providing the battery status and the distance to empty, wherein the data collection server comprises: a vehicle information collector collecting and storing therein the weather information, the travel information, and location information measured by the vehicle sensor; a weather information storage unit storing therein observation and forecast weather information received from an external weather system; and a topographic information storage unit storing therein topographic information on a slope, a curve, and a road surface of the vehicle travel path, wherein the information provision server comprises a battery status estimation unit estimating battery consumption by analyzing a correlation of the battery consumption with a vehicle model, the topographic information, the weather information, and road weather information directly related to driving of the electric vehicle, wherein the battery status estimation unit analyzes a driving pattern of a driver of the vehicle and uses the driving pattern for an analysis of the correlation of the battery consumption, wherein the information provision server comprises a driving pattern analysis unit analyzing the driving pattern of the driver, wherein the driving pattern analysis unit comprises: a weather information storage module storing therein the weather information in driving the vehicle; a road weather information storage module storing therein the road weather information directly related to the driving of the electric vehicle; a topographic information storage module storing therein the topographic information on the vehicle travel path; a travel information storage module storing therein the travel information on a speed and acceleration and deceleration of the vehicle; and a driving pattern detection module detecting the driving pattern based on the weather information, the road weather information, and the topographic information.

2. The information provision service system of claim 1, wherein the information provision server comprises a weather information advancement unit optimizing weather information forecasted by the external weather system, by using the weather information measured by the vehicle sensor, wherein the weather information advancement unit comprises: a sensor information loading module loading the weather information measured by the vehicle sensor; a forecast information loading module loading weather forecast information of the external weather system according to a location of the vehicle sensor; a correlation analysis module deriving the correlation by comparing the weather information loaded by the sensor information loading module and the weather forecast information of the external weather system; and a forecast information update module correcting the weather forecast information according to the derived correlation.

3. The information provision service system of claim 2, wherein the information provision server comprises a road weather information generation unit forecasting the road weather information on each road directly related to the driving of the electric vehicle, by using the weather forecast information, wherein the road weather information generation unit comprises: a weather information loading module loading the weather forecast information; a frost forecast information generation module, a fog forecast information generation module, and a flooding forecast information generation module forecasting frost, fog, and flooding by using the loaded weather forecast information, respectively; a forecast information verification module comparing the forecasted frost, fog, and flooding with information on frost, fog, and flooding that have actually occurred; and a forecast correction module correcting respective algorithms of the frost forecast information generation module, the fog forecast information generation module, and the flooding forecast information generation module according to a result of verification.

4. The information provision service system of claim 3, wherein the information provision server comprises a road hazard information provision unit for displaying the forecasted road weather information on the user terminal.

5. The information provision service system of claim 1, wherein the information provision server comprises an arrival information provision unit computing the battery consumption based on a destination of the vehicle through the battery status estimation unit and providing the distance to empty and battery state-of-charge information at the destination, wherein the arrival information provision unit comprises: an arrival location information reception module receiving arrival location information from the user terminal;

a travel path finding module finding paths between a current location and an arrival location; a path-based battery consumption computation module computing the battery consumption of each of the found paths; an arrival-based distance-to-empty computation module computing and for displaying the distance to empty at an arrival point according to the battery consumption of each of the paths; and an arrival-based battery state-of- charge display module for displaying battery state-of-charge.

6. The information provision service system of claim 5, wherein the arrival information provision unit comprises an arrival-based charging station information provision module for displaying charging station information near the arrival location and possibility of reaching a charging station.

7. The information provision service system of claim 1, wherein the information provision server comprises a charging information provision unit providing charging station information near a location of the vehicle, wherein the charging information provision unit comprises: a charging station finding module finding charging stations near the location of the vehicle; a charging station-based path finding module finding paths to the respective charging stations; a path-based battery consumption amount computation module computing the battery consumption for each of the found paths through the battery status estimation unit; and a reachability display module for displaying possibility of reaching the charging stations through the respective paths considering the battery status of the vehicle.

8. The information provision service system of claim 1, wherein the information provision server comprises a battery consumption map provision unit for displaying a vehicle-drivable range based on a current battery status of the vehicle,
the battery consumption map provision unit comprises: a vehicle-drivable path finding module finding vehicle-drivable paths with a current location of the vehicle in the center; a battery consumption information calculation module computing battery consumption information for each of the paths through the battery status estimation unit; a battery status information reception module receiving information on the current battery status of the vehicle; a reference value setting module setting a reference value for battery state-of-charge; and a reference value-based region display module for displaying a vehicle-drivable region based on the set reference value.

9. The information provision service system of claim 5, wherein the information provision server comprises a component power provision unit computing the battery consumption considering power consumption for each component of the vehicle,
wherein the component power provision unit comprises: a component-based power consumption display module for displaying the power consumption for each component; a component- based battery consumption computation module computing an influence of each component on the battery consumption; a battery consumption information correction module correcting battery consumption information based on the driving of the vehicle according to a stop of operation of each component; and a component-based distance-to-empty display module for displaying the distance to empty according to corrected battery consumption.

10. The information provision service system of claim 6, wherein the information provision server comprises a component power provision unit computing the battery consumption considering power consumption for each component of the vehicle,
wherein the component power provision unit comprises: a component-based power consumption display module for displaying the power consumption for each component; a component- based battery consumption computation module computing an influence of each component on the battery consumption; a battery consumption information correction module correcting battery consumption information based on the driving of the vehicle according to a stop of operation of each component; and a component-based distance-to-empty display module for displaying the distance to empty according to corrected battery consumption.

11. The information provision service system of claim 7, wherein the information provision server comprises a component power provision unit computing the battery consumption considering power consumption for each component of the vehicle,
wherein the component power provision unit comprises: a component-based power consumption display module for displaying the power consumption for each component; a component- based battery consumption computation module computing an influence of each component on the battery consumption; a battery consumption information correction module correcting battery consumption information based on the driving of the vehicle according to a stop of operation of each component; and a component-based distance-to-empty display module for displaying the distance to empty according to corrected battery consumption.

12. The information provision service system of claim 8, wherein the information provision server comprises a component power provision unit computing the battery consumption considering power consumption for each component of the vehicle,
wherein the component power provision unit comprises: a component-based power consumption display module for displaying the power consumption for each component; a component- based battery consumption computation module computing an influence of each component on the battery consumption; a battery consumption information correction module correcting battery consumption information based on the driving of the vehicle according to a stop of operation of each component; and a component-based distance-to-empty display module for displaying the distance to empty according to corrected battery consumption.

13. An information provision service system for an electric vehicle, the information provision service system comprising:
a vehicle sensor with which the vehicle is provided, and measuring both travel information of the vehicle and weather information;
a management server estimating both a battery status and a distance to empty of the electric vehicle by using the information measured by the vehicle sensor, and providing the battery status and the distance to empty;
a user terminal receiving estimated information from the management server and displaying the estimated information,
wherein the management server estimates the battery status and the distance to empty of the electric vehicle considering battery characteristics based on the weather information,
wherein the management server estimates the battery status and the distance to empty of the electric vehicle considering battery consumption characteristics based on topography of a vehicle travel path,
wherein the management server comprises: a data collection server collecting information for estimating the battery status and the distance to empty; and an information provision server estimating the battery status and the distance to empty by using collected data, and providing the battery status and the distance to empty,
wherein the data collection server comprises: a vehicle information collector collecting and storing therein the weather information, the travel information, and location information measured by the vehicle sensor; and a topographic information storage storing therein topographic information on a slope, a curve, and a road surface of the vehicle travel path,
wherein the information provision server comprises a battery status estimator estimating battery consumption by analyzing a correlation of the battery consumption with a vehicle model, the topographic information, the weather information, and road weather information directly related to driving of the electric vehicle, wherein the battery status estimator analyzes a driving pattern of a driver of the vehicle and uses the driving pattern for an analysis of the correlation of the battery consumption, wherein the information provision server comprises a driving pattern analyzer analyzing the driving pattern of the driver, wherein the driving pattern analyzer comprises: a weather information storage storing therein the weather information in driving the vehicle; a road weather information storage storing therein the road weather information directly related to the driving of the electric vehicle; a topographic information storage storing therein the topographic information on the vehicle travel path; a travel information storage storing therein the travel information on a speed and acceleration and deceleration of the vehicle; and a driving pattern detector detecting the driving pattern based on the weather information, the road weather information, and the topographic information.

\* \* \* \* \*